(12) United States Patent
Letterman et al.

(10) Patent No.: US 11,022,989 B2
(45) Date of Patent: Jun. 1, 2021

(54) AIR DISTRIBUTION SYSTEMS AND METHODS

(71) Applicant: Air Distribution Technologies IP, LLC, Milwaukee, WI (US)

(72) Inventors: Jason T. Letterman, McKinney, TX (US); David G. Pich, Frisco, TX (US); Virginia M. Sivie, Dallas, TX (US); Kazim C. Demirhan, Garland, TX (US); Hajo C. M. Siemers, Allen, TX (US)

(73) Assignee: AIR DISTRIBUTION TECHNOLOGIES IP, LLC, Milwaukee, WI (US)

( * ) Notice: Subject to any disclaimer, the term of this patent is extended or adjusted under 35 U.S.C. 154(b) by 53 days.

(21) Appl. No.: 15/965,555

(22) Filed: Apr. 27, 2018

(65) Prior Publication Data
US 2018/0329438 A1 Nov. 15, 2018

Related U.S. Application Data

(60) Provisional application No. 62/505,600, filed on May 12, 2017.

(51) Int. Cl.
| | |
|---|---|
| *G05D 23/27* | (2006.01) |
| *G05D 23/19* | (2006.01) |
| *F24F 11/46* | (2018.01) |
| *F24F 11/74* | (2018.01) |
| *F24F 11/80* | (2018.01) |
| *F24F 120/14* | (2018.01) |
| *F24F 110/10* | (2018.01) |
| *F24F 120/12* | (2018.01) |
| *F24F 11/58* | (2018.01) |

(52) U.S. Cl.
CPC .............. *G05D 23/27* (2013.01); *F24F 11/46* (2018.01); *F24F 11/74* (2018.01); *F24F 11/80* (2018.01); *G05D 23/1917* (2013.01); *G05D 23/1927* (2013.01); *G05D 23/1932* (2013.01); *F24F 11/58* (2018.01); *F24F 2110/10* (2018.01); *F24F 2120/12* (2018.01); *F24F 2120/14* (2018.01)

(58) Field of Classification Search
None
See application file for complete search history.

(56) References Cited

U.S. PATENT DOCUMENTS

| | | | |
|---|---|---|---|
| 6,079,626 A * | 6/2000 | Hartman | F24F 3/044 236/13 |
| 7,904,209 B2 * | 3/2011 | Podgorny | F24F 11/0009 700/276 |
| 8,147,302 B2 | 4/2012 | Desrochers et al. | |

(Continued)

*Primary Examiner* — Ryan A Jarrett
(74) *Attorney, Agent, or Firm* — Fletcher Yoder, P.C.

(57) ABSTRACT

The present disclosure relates to a heating, ventilation, and air conditioning (HVAC) system including a sensor system configured to detect heat indications within a plurality of areas of a conditioned space, wherein the sensor system comprise a thermal light detector, and a controller configured to receive feedback from the sensor system and, based on the feedback, control airflow distribution, via an airflow distribution system, such that airflow management for each of the plurality of areas is individually correlated to a heat indication detected for the respective area.

22 Claims, 7 Drawing Sheets

(56) References Cited

U.S. PATENT DOCUMENTS

| | | | |
|---|---|---|---|
| 9,323,233 | B2 | 4/2016 | Mohan et al. |
| 9,471,070 | B2 | 10/2016 | Sabripour |
| 10,371,399 | B1 * | 8/2019 | Rodriguez |
| 2008/0015740 | A1 | 1/2008 | Osann, Jr. |
| 2008/0244104 | A1 | 10/2008 | Clemente |
| 2015/0130631 | A1 | 5/2015 | Patel et al. |
| 2017/0045864 | A1 | 2/2017 | Fadell et al. |

* cited by examiner

AIR DISTRIBUTION SYSTEMS AND METHODS

CROSS REFERENCE TO RELATED APPLICATION

This application is a Non-Provisional application claiming priority to U.S. Provisional Application No. 62/505,600, entitled "ADAPTIVE DISTRIBUTION WITH INFRARED SENSORS," filed May 12, 2017, which is hereby incorporated by reference in its entirety for all purposes.

BACKGROUND

The present disclosure relates generally to heating, ventilation, and air conditioning systems. A wide range of applications exist for heating, ventilation, and air conditioning (HVAC) systems. For example, residential, light commercial, commercial, and industrial systems are used to control temperatures and air quality in residences and buildings. Such systems often are dedicated to either heating or cooling, although systems are common that perform both of these functions. Very generally, these systems operate by implementing a thermal cycle in which fluids are heated and cooled to provide the desired temperature in a controlled space, typically the inside of a residence or building. Similar systems are used for vehicle heating and cooling, and as well as for general refrigeration. In many HVAC systems, heated or cooled air may be administered based on readings from a thermostat.

SUMMARY

The present disclosure relates to a heating, ventilation, and air conditioning (HVAC) system including a sensor system configured to detect heat indications within a plurality of areas of a conditioned space, wherein the sensor system comprise a thermal light detector, and a controller configured to receive feedback from the sensor system and, based on the feedback, control airflow distribution, via an airflow distribution system, such that airflow management for each of the plurality of areas is individually correlated to a heat indication detected for the respective area.

The present disclosure also relates to a heating, ventilation, and air conditioning (HVAC) control system including a sensor system configured to detect a distribution of heat within a conditioned space, a plurality of airflow control devices configured to be actuated to control respective airflows from a common source to the conditioned space, and a controller configured to control each airflow control device of the plurality of airflow control devices based on the distribution of heat within the conditioned space.

The present disclosure further relates to a heating, ventilation, and air conditioning (HVAC) system including an infrared (IR) sensor configured to detect heat sources within a room and a plurality of air outlets configured to deliver conditioned air to the room, wherein the HVAC system is configured to deliver the conditioned air through each air outlet of the plurality of air outlets according to a distribution of the heat sources within the room.

DRAWINGS

DETAILED DESCRIPTION

The present disclosure is directed to heating, ventilation, and air conditioning (HVAC) systems which may administer air based on a distribution of heat or heat sources throughout a room, a building, or other conditioned space. Particularly, the HVAC system may include heat sensors or thermal light detectors, such as infrared (IR) sensors, configured to detect heat sources within the room, building, or other conditioned space. The HVAC system may utilize data gathered by the heat sensors to provide conditioning air flows, such as heated or cooled air, to preemptively condition portions of the room, building, or conditioned space as the distribution of heat changes within the portions of the room, building, or conditioned space. For example, as the heat sensors or thermal light detectors detect heat sources in a particular portion of the room, building, or conditioned space, the HVAC system may supply conditioned air the particular portion to preemptively cool the air. Overall, the HVAC system may provide individualized conditioning air flows to respective portions of a room, building, or conditioned space as the heat sensors or thermal light detectors detect changes in heat sources of the area. In this manner, the HVAC system may be utilized more effectively and may reduce stratified zones within the room, building, or conditioned space, such as an uneven distribution of temperatures within the room.

Figure 1:
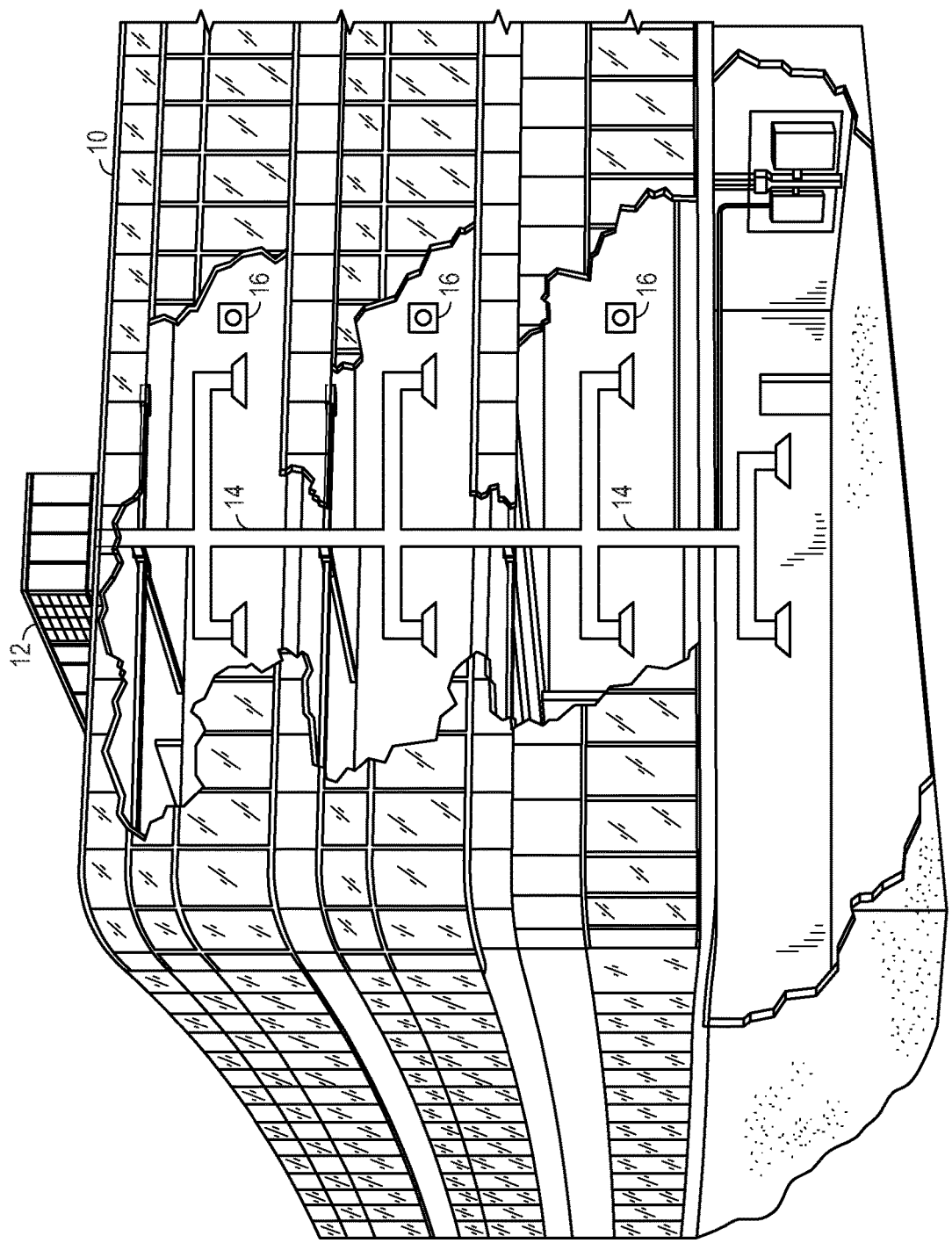
FIG. 1 is a perspective view of a heating, ventilation, and air conditioning (HVAC) system for building environmental management that may employ one or more HVAC units, in accordance with an embodiment of the present disclosure.

Turning now to the drawings, FIG. 1 illustrates a heating, ventilation, and air conditioning (HVAC) system for building environmental management that may employ one or more HVAC units. In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
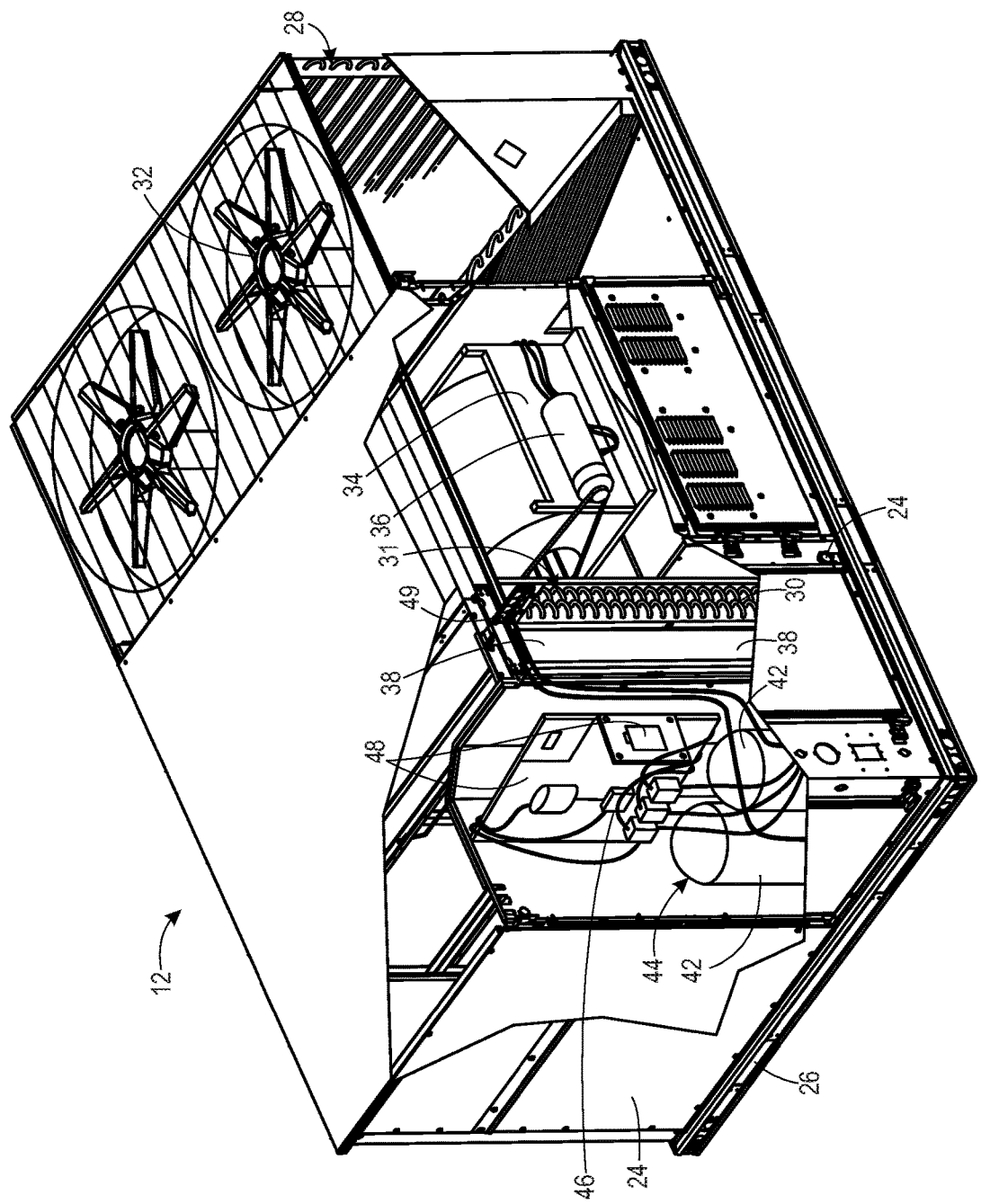
FIG. 2 is a perspective view of an HVAC unit of the HVAC system of FIG. 1, in accordance with an embodiment of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
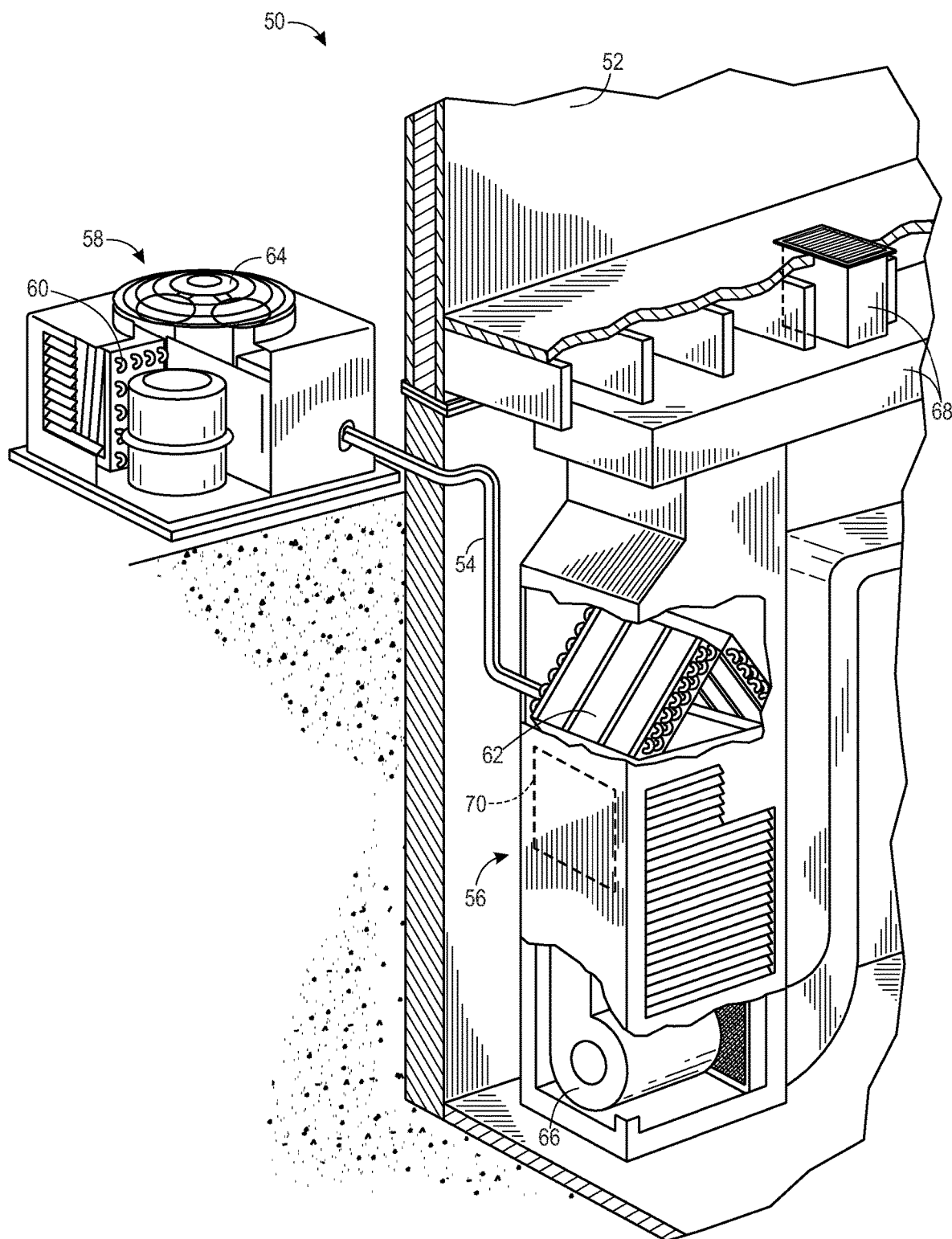
FIG. 3 is a perspective view of a residential split heating and cooling system, in accordance with an embodiment of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
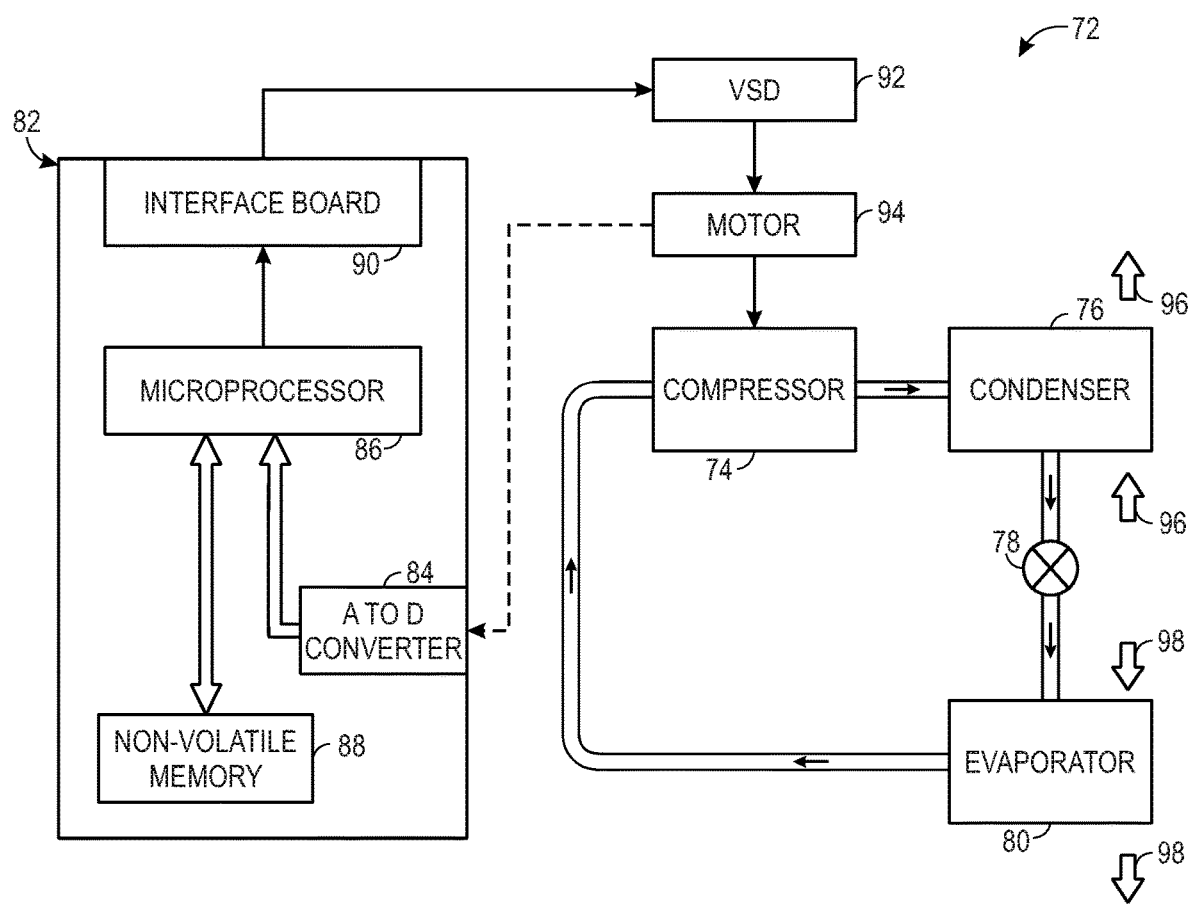
FIG. 4 is a schematic view of a vapor compression system that may be used in an HVAC system, in accordance with an embodiment of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 38 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

As discussed below, a heating, ventilation, and air conditioning (HVAC) system 100, such as the HVAC unit 12, the heating and cooling system 50, and/or the vapor compression system 72, may include an adaptive air distribution system configured to administer conditioned air according to a distribution of heat within a room, building, or conditioned space. For example, the HVAC system 100 may detect heat sources, such as people, machines, animals, solar loads, and so forth, and may administer conditioned air accordingly to condition the air within the room, building, or conditioned space. In one embodiment, conditioned air may be provided to portions or limited areas of the room, building, or conditioned space to reduce air stratification, such as an uneven distribution of temperatures, within the room, building, or conditioned space. In certain instances, stratified zones may occur if portions of the room, building, or conditioned space contain large, or numerous, heat sources, while other portions of the room, building, or conditioned space contain moderate, or few, heat sources. Particularly, the HVAC system 100 may reduce air stratification by providing individualized heating, ventilation, and/or air conditioning to portions of the room, building, or conditioned space based on the detected heat sources. That is, the HVAC system 100 may provide conditioning air flows in response to a presence of heat sources in addition to, or alternatively to, providing conditioning air flows in response to a changing temperature of the room, building, or conditioned space.

Figure 5:
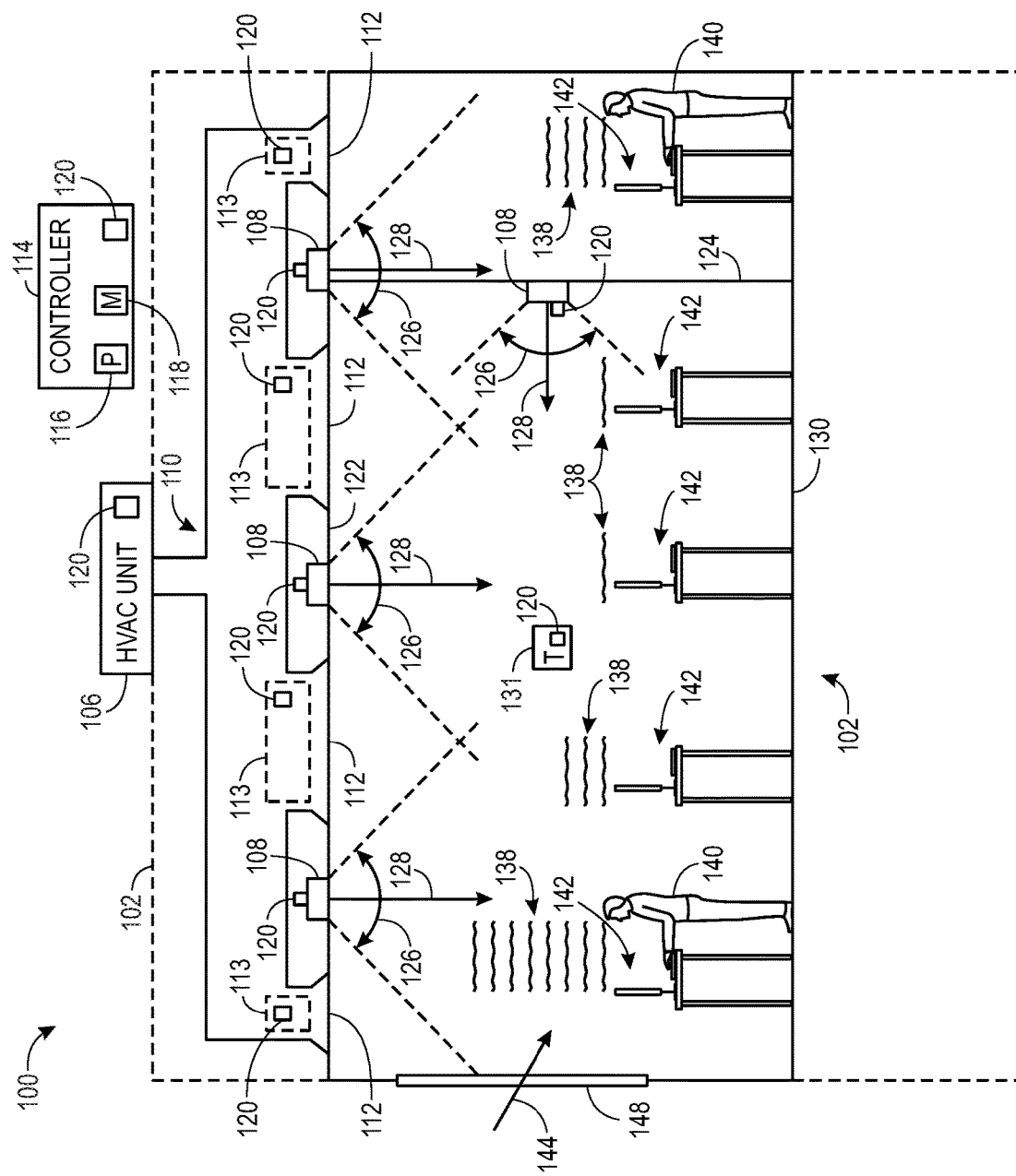
FIG. 5 is a schematic view of an air distribution system, in accordance with an embodiment of the present disclosure.

To illustrate, FIG. 5 is a schematic view of the HVAC system 100 that is configured to provide individualized heating, ventilation, and/or air conditioning to a conditioned space, such as to portions of rooms 102, of a building 104. While the discussion below focuses on an embodiment of the HVAC system 100 providing conditioned air to portions of the rooms 102, the techniques described herein may be used to provide conditioned air to portions of a building, such as different rooms, or portions of any other conditioned space.

In the illustrated embodiment, the HVAC system 100 includes an HVAC unit 106, such as the HVAC unit 12 or the heating and cooling system 50, heat sensors or thermal light detectors 108, and an air duct system 110, which is configured to administer air through outlets 112, such as variable air volume (VAV) diffusers. Each outlet 112 and/or groups of the outlets 112 may utilize an air control device 113, such as a variable air volume (VAV) box, which may control a volumetric flow rate of air as it passes through the outlet 112 and/or a reheat terminal, which may control a temperature of air as it passes through the outlet 112. Similarly, in certain embodiments, the air control device 113 may include fan coils and/or chilled beams. Indeed, in certain embodiments, the HVAC system 100 may be a VAV system, which is configured to adjust a flow rate of the air and/or may be a constant air volume (CAV) system, which is configured to adjust a temperature of the air.

Further, the HVAC system 100 may be communicatively coupled to a controller 114. The controller 114 may employ a processor 116, which may represent one or more processors, such as an application-specific processor. The controller 114 may also include a memory device 118 for storing instructions executable by the processor 116 to perform the methods and control actions described herein for the HVAC system 100. The processor 116 may include one or more processing devices, and the memory 118 may include one or more tangible, non-transitory, machine-readable media. By way of example, such machine-readable media can include RAM, ROM, EPROM, EEPROM, CD-ROM, or other optical disk storage, magnetic disk storage or other magnetic storage devices, or any other medium which can be used to carry or store desired program code in the form of machine-executable instructions or data structures and which can be accessed by the processor 116 or by any general purpose or special purpose computer or other machine with a processor. In certain embodiments, the controller 114 may be directly coupled to, or disposed within, the HVAC unit 106.

The controller 114 may be communicatively coupled to the HVAC unit 106, the heat sensors or thermal light detectors 108, and/or the air control devices 113 through a communication system 120. In some embodiments, the communication system 120 may communicate through a wireless network, such as wireless local area networks [WLAN], wireless wide area networks [WWAN], near field communication [NFC], or Bluetooth. In some embodiments, the communication system 120 may communicate through a wired network such as local area networks [LAN], or wide area networks [WAN].

As discussed herein, the heat sensors or thermal light detectors 108 are configured to detect, measure, and/or determine the presence and the intensity, or concentration, of heat sources of an area. As used herein, the term "thermal light detector" includes thermographic cameras, infrared (IR) sensors, or any other suitable sensor configured to detect IR radiation, or electromagnetic wavelengths within the infrared spectrum, which may indicate that heat is radiating from an object. That is, the heat sensors thermal light detectors 108 may determine an intensity or level of heat of a surface of an object relative to surroundings of the object. In some embodiments, the heat sensors thermal light detectors 108 may be coupled to a ceiling 122 and/or a wall 124 of the room 102. In some embodiments, the heat sensors thermal light detectors 108 may be associated with a field of view 126, which may refer to an area of coverage, and with a range 128, which may refer to a distance from the heat sensor thermal light detector 108 in which the heat sensor thermal light detector 108 may accurately and/or reliably sense IR radiation. Indeed, the field of view 126 and the range 128 may depend at least in part on the type of heat sensor thermal light detector 108 utilized.

The heat sensors 108 may be positioned such that the fields of view 126 of the heat sensors 108 substantially covers an area of a floor 130 of the room 102. Further, the heat sensors 108 may be positioned such that the range 128 reaches a suitable level within the room. For example, in certain embodiments, the heat sensors 108 may be disposed such that the associated ranges 128 extend approximately to the floor 130, to approximately a standard body height from the floor 130, or any other suitable distance from the floor 130. Overall, the number of heat sensors 108 and their location within the room 102 may depend at least in part on the field of view 126, the range 128, and/or other specifications of the heat sensor 108. In certain embodiments, the heat sensors 108 may be configured to detect a temperature distribution throughout the room 102.

In certain embodiments, the HVAC system 100 may include one or more thermostats 131, or temperature and humidity sensors, configured to detect a temperature and/or humidity of the room. The HVAC system 100 may utilize data gathered by the thermostat 131 to calibrate the heat sensors 108 to accurately measure the temperature distribution throughout the room. For example, the thermostat 131 may detect the temperature in a portion of the room 102 in which the thermostat 131 is located, and the heat sensors 108 may detect the concentration of heat in the portion of the room 102 in which the thermostat 131 is located. The controller 114 may utilize the temperature data from the thermostat 131 and heat distribution data from the heat sensors 108 to determine the temperature distribution throughout the room 102.

As shown in FIG. 5, certain activities, objects, orientation, and other elements of the room 102 may affect a distribution of heat within the room 102. To help illustrate, an intensity/level of heat within the room 102 is represented with horizontal lines 138. For example, the amount of lines 138 vertically stacked in a certain area may be directly related to an amount of heat being distributed within the certain area. As shown, the amount of heat may be increased by the presence of humans 140, or other organisms, machines 142, a solar load 144, and/or other sources of heat. For example, the machines 142 that are in operation, which are illustrated as the machines 142 that are being operated by the humans 140, may output more heat than the machines 142 that are not in operation, which are illustrated as the machines 140 that do not have the humans 140 adjacent to the machines 142. Indeed, the machines 142 may be any machine 142 that may output heat, such as computers, televisions, servers, automation equipment, artificial light sources, manufacturing equipment, and so forth. Further, a portion of the room 102 may increase in heat due to the solar load 144, which may be a result of the proximity of the portion of the room 102 to a window 148 through which solar energy may travel. Therefore, an area of the room 102 adjacent to the window 148, which is experiencing the solar load 144, is illustrated with an increased amount of lines 138 to indicate a high intensity heat source in the area. Indeed, as shown, heat sources may be unevenly distributed throughout the room 102, and the HVAC system 100 may distribute conditioning air flows to the room 102 accordingly.

The HVAC system 100 may detect the distribution of heat, heat sources, a temperature/thermal gradient, or any combination thereof throughout the room 102 via the heat sensors 108. Particularly, the heat sensors 108 may gather data indicative of the heat distribution, such as a thermal or temperature gradient, throughout the room and communicate the data to the controller 114. The controller 114 may analyze the data and send corresponding signals to the HVAC unit 106 and/or the air control devices 113 to cool or heat certain portions of the room 102, such that the temperature distribution throughout the room 102 is substantially constant and substantially matches a set-point temperature. For example, in portions of the room 102 that are determined, via the heat sensors 108 and the controller 114, to contain higher intensity heat sources may receive cooler air and/or an increased cool air flow with respect to portions of the room 102 that are determined to contain lower intensity heat sources. Similar principals may be utilized by the HVAC system 100 when particularly low intensity heat sources are present that may cause portions of the room 102 to have particularly low temperatures. For example, in portions of the room 102 that are determined, via the heat sensors 108 and the controller 102, to contain low intensity heat sources may receive warmer air and/or an increased warm air flow with respect to portions of the room 102 that are determined to contain higher intensity heat sources. In certain embodiments, the heat sensors 108 may detect an occupancy distribution of the room 102 and may provide the conditioning air flows accordingly by preemptively cooling areas within higher concentrations of occupancy.

Figure 6:
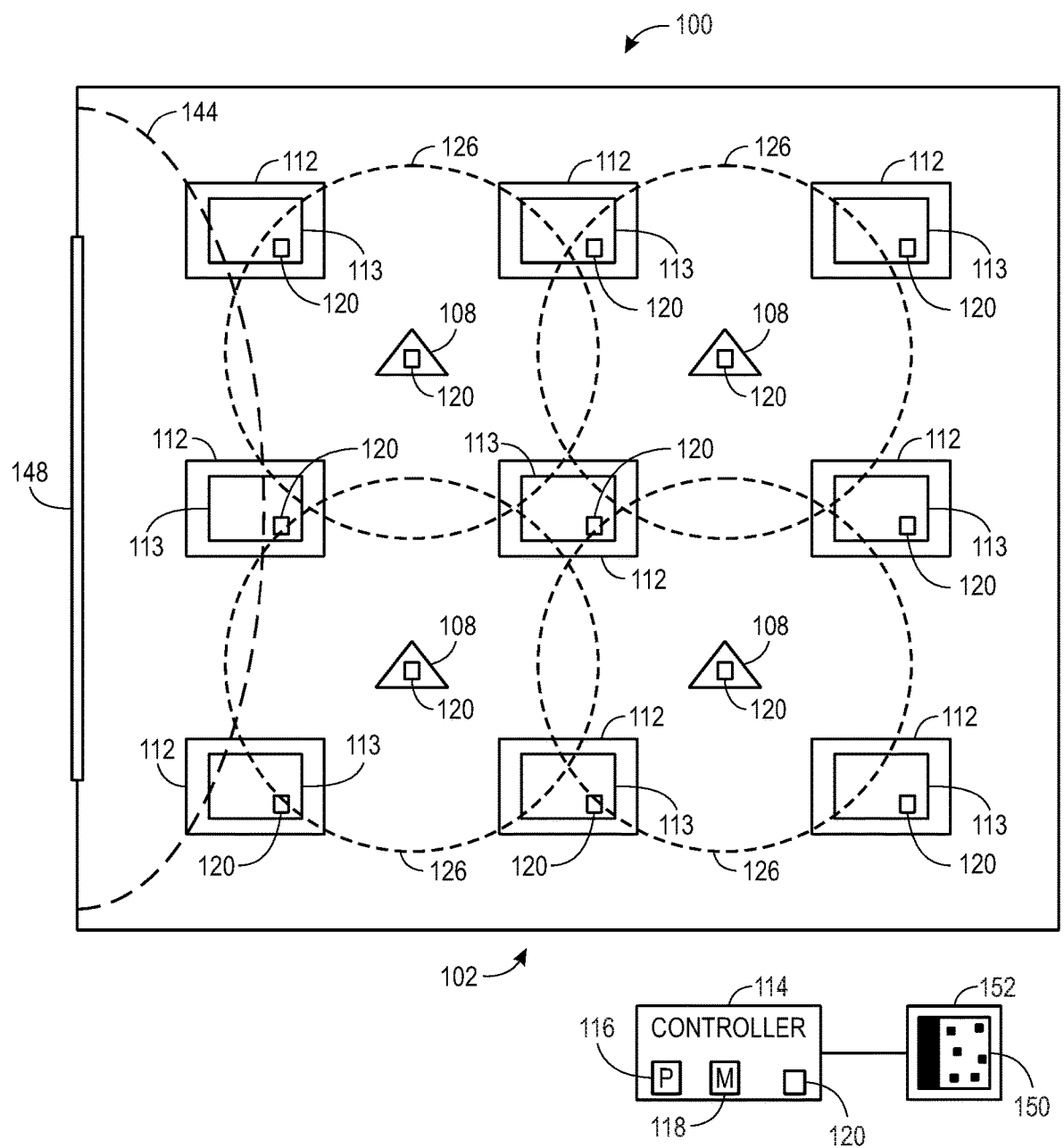
FIG. 6 is a schematic view of the air distribution system of FIG. 5, in accordance with an embodiment of the present disclosure.

FIG. 6 is a schematic top view of the room 102 showing an embodiment of a distribution of the heat sensors 108 and the outlets 112 throughout the room 102. In some embodiments, the room 102 may be a large room with a variety of functions such as a ballroom, a cafeteria, a library, a lobby, an office space, a training room, a restaurant, a server room, a call center, or any other suitable type of room. In the current embodiment, the heat sensors 108 are positioned between the outlets 112 such that there are four heat sensors 108 and nine outlets 112. Indeed, in certain embodiments, the room 102 may include an array of the heat sensors 108. However, as mentioned above, it is to be understood that the room 102 may include any suitable number of heat sensors 108. In certain embodiments, the amount of heat sensors 108 may depend on the specifications of the heat sensors 108, such as the field of view 126, the range 128, the resolution, and so forth. For example, in some embodiments, the HVAC system 100 may utilize a single heat sensor 108 with a large field of view 126 configured to substantially cover the room 102. In some embodiments, the fields of view 126 of the heat sensors 108 may overlap, which may provide for redundancy and/or validation in determining the distribution of heat within the room 102. In some embodiments, the HVAC system 100 may include one heat sensor 108 per outlet 112 or air control device 113. In some embodiments, the number of heat sensors 108 and/or coverage of the heat sensors 108 utilized by the HVAC system 100 may be such that only portions of the room 102 are monitored by the heat sensors 108, such as portions of the room 102 that are expected to have a high variance, or high fluctuation, in heat sources and/or temperatures.

As mentioned above, the heat sensors 108 may gather data indicative of the distribution of heat sources in the room 102 and communicate the data to the controller 114. In certain embodiments, the heat sensors 108 and the controller 114 may generate a heat map 150, or two-dimensional (2D) image, of the distribution of heat sources, distribution of temperature, distribution of occupancy, or any combination thereof of the room 102. The heat map 150 may be displayed on a user interface 152, such as a graphical user interface (GUI) communicatively coupled to the controller 114. For example, as shown, due at least in part to the solar load 144 in the room 102 adjacent to the window 148, the heat map 152 may indicate increased heat in the portion of the room 102 adjacent to the window 148 that is experiencing the solar load 144. Accordingly, the controller 114 may increase cooling administered through the outlets 112 within the portion of the room 102 experiencing the solar load 144 by actuating the respective air control devices 113. Indeed, the controller 114 may also increase cooling administered through outlets 112 that are adjacent to other sources of heat, such as machines 142, humans 140, and so forth.

As discussed herein, the HVAC system 100 may identify heat sources within the room 102 or other conditioned space and administer an appropriate amount of air at an appropriate temperature to reduce air stratification, such as an uneven distribution of temperatures, within the room 102, building, or conditioned space. Specifically, the HVAC system 100 may utilize predictive control to preemptively cool or heat portions of the room 102 or building that have been identified as potential causes or areas of air stratification, such as portions of the room 102 having low intensity heat sources, such as cold objects, or high intensity heat sources, such as hot objects. That is, the HVAC system 100 may administer the appropriate or desired amount and temperature of air to the portions of the room 102 or conditioned space having potential sources of air stratification as the potential sources of air stratification enter, or appear within, the portion of the room 102, or shortly thereafter. In other words, the HVAC system 100 may administer air to condition the room 102 before the potential sources of air stratification are able to cause a significant and/or a noticeable amount of air stratification within the room 102. Indeed, alternatively or in addition to the HVAC system 100 providing conditioned air based on changes in temperature in the room 102, the HVAC system 100 may provide condition air based on the presence of sources that could potentially cause changes in temperature. Therefore, because the HVAC system 100 may preemptively cool a space within the room 102, the HVAC system 100 may operate for a shorter period of time and in more specified areas to condition the room 102, thereby providing cost efficiency and energy efficiency. Particularly, the HVAC system 100 may provide for cost and energy efficiency relative to systems that provide conditioned air based only on a disparity between a measured temperature of a space and a set-point temperature of the space.

In some embodiments, the amount and temperature of air that the HVAC system 100 supplies to the room 102 may be calibrated according to an intensity and duration of the heat source. That is, if a high-intensity heat source appears in a certain portion of the room 102 for a short amount of time, the HVAC system 100 may supply cooled air to the certain portion of the room 102 for a short amount of time. Similarly, if a high-intensity heat source appears in a certain portion of the room 102 and remains in the certain portion of the room 102, the HVAC system 100 may continuously supply cooled air to the certain portion of the room 102 at least while the high-intensity heat source remains in the certain portion of the room 102. In certain embodiments, the HVAC system 100 may detect a rate of temperature change, or rate of change of heat intensity in the room 102, and may accordingly increase or decrease an amount and/or a temperature of supplied air.

In some embodiments, the heat sensors 108 may be capable of detecting motion within the room 102. Indeed, in such embodiments, the HVAC system 100 may be capable of determining occupancy of the room 102 via the heat sensors 108. To this end, the heat sensors 108 may be configured to detect a human form, such as via a detected heat signature. In some embodiments, the heat sensors 108 may detect human forms by detecting a motion or change in detected heat distribution. The heat sensors 108 may also be configured to detect other characteristics or attributes of humans, such as face detection, to determine occupancy of the room 102. In such embodiments, the heat sensors 108 may send data indicative of the human forms or motion to the controller 114, which in turn may control the HVAC system 100 to condition the room 102 based on the human forms or motion within the room. As discussed herein, the HVAC system 100 system may adjust an amount and/or temperature of the conditioned air flows by adjusting an operation of the HVAC unit 106 and/or by adjusting operation of the air control devices 113.

Figure 7:
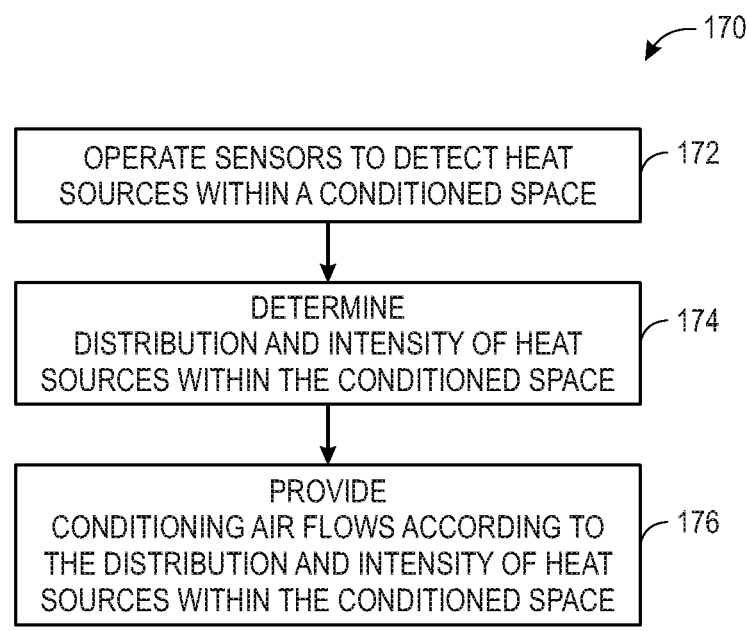
FIG. 7 is a flow chart of a process of the air distribution system of FIG. 5, in accordance with an embodiment of the present disclosure.

FIG. 7 is a flow chart illustrating a control process 170 of the HVAC system 100. At block 172, the HVAC system 100 may operate the heat sensors 108 to detect heat sources within a conditioned space, such as the room 102. Indeed, the heat sensors 108 may detect infrared (IR) radiation emanating from objects within the conditioned space, thereby detecting heat source outliers of the conditioned space. In other embodiments, the heat sensors 108 may be any other suitable type of sensor. In some embodiments, detecting heat sources within the conditioned space may include detecting a temperature distribution, and/or an occupancy distribution of the conditioned space.

At block 174, the HVAC system 100 may determine a distribution and intensity of heat sources. Indeed, discussed above, determining the distribution and intensity of heat sources within the conditioned space may include detecting a heat distribution, temperature distribution, occupancy distribution, or any combination thereof. Specifically, the HVAC system 100 may utilize the controller 114 to aggregate and analyze data gathered by the heat sensors 108 indicative of heat distribution throughout the room 102 to determine the distribution and intensity of heat sources. Analysis of the data may include generation of a heat map of the conditioned space indicating a distribution and/or intensity of heat throughout portions or all of the conditioned space.

At block 176, the HVAC system 100 may provide conditioning air flows according to the distribution and/or intensity of heat sources within the conditioned space. For example, when the HVAC system 100 identifies certain portions of the conditioned space to include high-intensity heat sources which could potentially cause a rise in temperature in the certain portions, and thereby causing air stratification throughout the conditioned space, the HVAC system 100 may provide the conditioned air flows to prevent the air stratification. In other words, the HVAC system 100 may provide conditioned air flows in response to an uneven or changing distribution of heat sources within the conditioned space prior to a significant temperature change in the conditioned space. In this manner, because the HVAC system 100 may efficiently condition the conditioned space by providing focused conditioning air flows to the certain portions of the conditioned space to reduce air stratification, the HVAC system 100 may provide for an increase in efficiency.

Accordingly, the present disclosure is directed to providing systems and methods for an adaptive air distribution heating, ventilation, and air conditioning (HVAC) system. The adaptive HVAC system may monitor the presence and distribution of heat sources within a conditioned space, such as a room, and may provide conditioning air flows based on a distribution of the heat sources. In this manner, the adaptive HVAC system may preemptively condition the conditioned space before the heat sources cause a significant change in temperature, or comfort level, in the space in which the heat sources are located. That is, the adaptive HVAC system may provide individualized, or targeted air flows, to respective portions of the conditioned space, thereby preventing air stratification and providing for an increase in efficiency.

While only certain features and embodiments of the present disclosure have been illustrated and described, many modifications and changes may occur to those skilled in the art, such as variations in sizes, dimensions, structures, shapes and proportions of the various elements, values of parameters, such as temperatures or pressures, mounting arrangements, use of materials, colors, orientations, and so forth, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the present disclosure. Furthermore, in an effort to provide a concise description of the exemplary embodiments, all features of an actual implementation may not have been described, such as those unrelated to the presently contemplated best mode of carrying out the present disclosure, or those unrelated to enabling the claimed embodiments. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A heating, ventilation, and/or air conditioning (HVAC) system, comprising:
   a sensor system configured to detect heat indications within a plurality of areas of a conditioned room, wherein the sensor system comprises a first thermal light detector configured to detect a first heat indication in a first area of the plurality of areas of the conditioned room and a second thermal light detector configured to detect a second heat indication in a second area of the plurality of areas of the conditioned room;
   a controller configured to receive data corresponding to the first heat indication and the second heat indication from the sensor system and, based on the data, control airflow distribution, via an airflow distribution system, through a first airflow path terminating at a first air outlet of the conditioned room, wherein the first air outlet corresponds to the first area, and through a second airflow path terminating at a second air outlet of the conditioned room, wherein the second air outlet corresponds to the second area; and
   a user interface communicatively coupled with the controller, wherein the controller is configured to generate, based on the data, a two-dimensional heat map of the conditioned room, the two-dimensional heat map of the conditioned room including an illustration of the plurality of areas of the conditioned room and the heat indications superimposed over the plurality of areas of the conditioned room, and wherein the user interface is configured to display the two-dimensional heat map.

2. The HVAC system of claim 1, comprising the airflow distribution system, wherein the airflow distribution system includes a plurality of flow control devices, wherein the plurality of flow control devices is configured to be actuated to control airflow volume or airflow temperature to the plurality of areas.

3. The HVAC system of claim 1, wherein the sensor system is configured to detect human forms.

4. The HVAC system of claim 1, wherein the sensor system is configured to detect additional heat indications within a plurality of additional areas of the conditioned room that are not used for control.

5. The HVAC system of claim 1, comprising:
   a first temperature control device disposed in the first airflow path; and
   a second temperature control device disposed in the second airflow path, wherein the first temperature control device comprises a first chilled beam or a first fan coil configured to a first portion of receive refrigerant, and wherein the second temperature control device comprises a second chilled beam or a second fan coil configured to receive a second portion of refrigerant.

6. The HVAC system of claim 1, comprising a thermostat configured to detect a temperature within the first area, wherein the controller is configured to:
   receive temperature data from the thermostat; and
   calibrate the first thermal light detector based at least in part on the temperature data.

7. The HVAC system of claim 6, comprising an additional thermostat configured to detect an additional temperature within the second area, wherein the controller is configured to:
   receive additional temperature data from the additional thermostat;
   calibrate the second thermal light detector based at least in part on the temperature data; and
   determine, based on the first heat indication, based on the second heat indication, and after calibrating the first thermal light detector based at least in part on the temperature data and the second thermal light detector based at least in part on the additional temperature data, a distribution of heat through the plurality of areas of the conditioned room.

8. A heating, ventilation, and/or air conditioning (HVAC) system, comprising:
   a sensor system configured to detect a distribution of heat within a conditioned room, wherein the sensor system includes a first thermal light detector configured to detect a first portion of the distribution of heat corresponding to a first area of the conditioned room and a second thermal light detector configured to detect a second portion of the distribution of heat corresponding to a second area of the conditioned room;
   a plurality of air control devices configured to be actuated to control airflows to the conditioned room, wherein the plurality of air control devices comprises a first chilled beam corresponding to the first area of the conditioned room and a second chilled beam corresponding to the second area of the conditioned room;
   a plurality of physically separate flow paths, wherein each physically separate flow path of the plurality of physically separate flow paths terminates at a corresponding physically separate air outlet of a plurality of physically separate air outlets, wherein the plurality of physically separate flow paths includes a first physically separate flow path corresponding to the first area of the conditioned room and having at least a portion of the first chilled beam extending therein, and wherein the plurality of physically separate flow paths includes a second physically separate flow path corresponding to the second area of the conditioned room and having at least an additional portion of the second chilled beam extending therein; and
   a controller configured to receive first data indicative of the first portion of the distribution of heat from the first thermal light detector and second data indicative of the second portion of the distribution of heat from the second thermal light detector, to determine a first target airflow property based on the first data, to determine a second target airflow property based on the second data, to control the first chilled beam to facilitate a first airflow having the first target airflow property through the first physically separate flow path and to the first area of the conditioned room, and to control the second chilled beam to facilitate a second airflow having the second target airflow property through the second physically separate flow path and to the second area of the conditioned room.

9. The HVAC system of claim 8, wherein the plurality of air control devices comprises a variable air volume (VAV) box or a reheat terminal.

10. The HVAC system of claim 8, wherein the sensor system comprises an infrared (IR) sensor.

11. The HVAC system of claim 8, wherein the controller is configured to control each air control device of the plurality of air control devices based on a target temperature distribution throughout the conditioned room being substantially equalized.

12. The HVAC system of claim 8, further comprising a communication system, wherein the sensor system, the plurality of air control devices, and the controller are communicatively coupled via the communication system.

13. The HVAC system of claim 8, comprising a user interface communicatively coupled with the controller, wherein the controller is configured to generate, based on the first data, the second data, or both, a two-dimensional heat map of the conditioned room, wherein the two-dimensional heat map of the conditioned room includes an illustration of the first area of the conditioned room, the second area of the conditioned room, and heat indications superimposed over the first area, the second area, or both, and wherein the user interface is configured to display the two-dimensional heat map of the conditioned room.

14. The HVAC system of claim 8, wherein the first airflow property comprises a first temperature and the second airflow property comprises a second temperature.

15. A heating, ventilation, and/or air conditioning (HVAC) system, comprising:
a first infrared (IR) sensor configured to detect first heat sources within a first area of a room;
a second IR sensor configured to detect second heat sources within a second area of the room;
a controller configured to receive, from the first IR sensor and the second IR sensor, data indicative of the first heat sources and the second heat sources, respectively, and to determine, based on the data, a first desired temperature of a first airflow directed to the first area of the room and a second desired temperature of a second airflow directed to the second area of the room, wherein the first desired temperature is different than the second desired temperature and the first area of the room is different than the second area of the room;
a plurality of fan coils including a first fan coil configured to receive a first portion of refrigerant and to be controlled by the controller to cause the first airflow to have the first desired temperature and a second fan coil configured to receive a second portion of refrigerant and to be controlled by the controller to cause the second airflow to have the second desired temperature, wherein the first fan coil is fluidly separate from the second fan coil; and
a plurality of air outlets including a first air outlet associated with the first fan coil and the first area of the room and a second air outlet associated with the second fan coil and the second area of the room, wherein the HVAC system is configured to deliver, via control of at least the first fan coil and the second fan coil by the controller, the first airflow at the first desired temperature to the first area of the room via the first air outlet and the second airflow at the second desired temperature to the second area of the room via the second air outlet.

16. The HVAC system of claim 1, wherein the first IR sensor comprises an array of IR detectors.

17. The HVAC system of claim 15, wherein the HVAC system is configured to determine, based on the data, a distribution of occupancy of the room, and wherein the HVAC system is configured to deliver the conditioned air through each air outlet of the plurality of air outlets according to the distribution of occupancy.

18. The HVAC system of claim 15, comprising an HVAC unit fluidly coupled to the plurality of air outlets, wherein the HVAC unit is configured to adjust an amount of conditioned air delivered to the plurality of air outlets based on a distribution of heat sources within the room.

19. The HVAC system of claim 15, comprising a user interface communicatively coupled with the controller, wherein the controller is configured to generate, based on the data, a two-dimensional heat map of the room, wherein the two-dimensional heat map of the room includes an illustration of the first area of the room, the second area of the room, and heat indications superimposed over the first area, the second area, or both, and wherein the user interface is configured to display the two-dimensional heat map of the room.

20. The HVAC system of claim 15, wherein the controller is configured to cause the first airflow at the first desired temperature to be delivered to the first area of the room through the first air outlet at a point in time, and wherein the controller is configured to cause the second airflow at the second desired temperature to be delivered to the second area of the room through the second air outlet at the point in time.

21. The HVAC system of claim 15, comprising a first fan, first diffuser, or first damper corresponding to the first area of the room and a second fan, second diffuser, or second damper corresponding to the second area of the room, wherein the controller is configured to control the first fan, first diffuser, or first damper based on the data to cause a first airflow volume of the first airflow, and wherein the controller is configured to control the second fan, second diffuser, or second damper based on the data to cause a second airflow volume of the second airflow.

22. The HVAC system of claim 15, wherein the first fan coil is configured to be controlled to cool the first airflow and the second fan coil is configured to be controlled to cool the second airflow.

* * * * *